United States Patent
Lee et al.

(10) Patent No.: US 8,749,160 B2
(45) Date of Patent: Jun. 10, 2014

(54) LED DRIVER CIRCUIT AND METHOD OF DRIVING LED

(75) Inventors: Sang-hoon Lee, Suwon-si (KR); Sung-jin Choi, Anyang-si (KR); Myoung-jun Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 13/313,161

(22) Filed: Dec. 7, 2011

(65) Prior Publication Data

US 2012/0319615 A1    Dec. 20, 2012

(30) Foreign Application Priority Data

Jun. 16, 2011    (KR) .................. 10-2011-0058653

(51) Int. Cl.
*H05B 37/00*    (2006.01)

(52) U.S. Cl.
USPC ............ 315/289; 315/219; 315/223; 315/291

(58) Field of Classification Search
USPC ......... 315/289, 290, 291, 306, 307, 219, 222, 315/223, 276, 283
See application file for complete search history.

(56) References Cited

U.S. PATENT DOCUMENTS

| | | | |
|---|---|---|---|
| 7,317,403 B2 * | 1/2008 | Grootes et al. | ............ 340/815.45 |
| 7,843,147 B2 * | 11/2010 | Chenetz | ........................ 315/291 |
| 2007/0229001 A1 * | 10/2007 | McIntosh et al. | ............. 315/307 |
| 2009/0085490 A1 | 4/2009 | Awalt et al. | |
| 2009/0195180 A1 | 8/2009 | Chenetz | |

FOREIGN PATENT DOCUMENTS

WO    2009/157763 A2    12/2009

OTHER PUBLICATIONS

Communication from the European Patent Office issued Oct. 16, 2012 in counterpart European Application No. 11193282.8.

* cited by examiner

*Primary Examiner* — James H Cho
(74) *Attorney, Agent, or Firm* — Sughrue Mion, PLLC

(57) ABSTRACT

A light emitting diode (LED) driver circuit is provided. The LED driver circuit includes an LED the LED; a power unit which provides a current to the LED through an inductor; a dimming switch which is connected to the LED and bypasses the current provided to the LED; an input unit which receives brightness information of the LED; a logic unit which calculates reference currents for each driving mode according to the received brightness information; a current control unit which controls the power unit to provide the current based on the driving mode and the calculated reference currents to the inductor; and a switch control unit which switches the dimming switch on if the driving mode of the LED driver circuit is switched to the dimming mode.

18 Claims, 12 Drawing Sheets

LED DRIVER CIRCUIT AND METHOD OF DRIVING LED

CROSS-REFERENCE TO RELATED APPLICATION

This application claims priority from Korean Patent Application No. 10-2011-0058653, filed on Jun. 16, 2011, in the Korean Intellectual Property Office, the disclosure of which is incorporated herein by reference in its entirety.

BACKGROUND

1. Field

Apparatuses and methods consistent with exemplary embodiments relate to a light emitting diode (LED) driver circuit and a method of driving an LED, and more particularly, to an LED driver circuit having a low return current in a dimming mode and a method of driving an LED.

2. Description of the Related Art

Liquid crystal displays (LCDs) are thin and heavy and have a lower driving voltage and power consumption as compared with other display devices and thus, have been widely used. However, since the LCDs are non-emitting devices which cannot emit light, separate backlights are necessary to supply light to LCD panels.

As a light source for the backlight of the LCD, cold cathode fluorescent lamp (CCFL), LED, and the like are often used. However, CCFLs have drawbacks. Since the CCFL uses mercury, the CCFL may cause environmental pollution. Further, CCFL has a low response time and lower reproducibility. Thus CCFL is not appropriate for constructing lighter and thinner LCD panels.

On the contrary, since LEDs do not use an environment pollution material, LEDs are environmentally-friendly and capable of impulse driving. LEDs have advantages for the sort of lightness and thinness required in a modern LCD panel. Furthermore, with LEDs, luminance, color temperature, or the like, may be arbitrarily changed by adjusting a light intensity of red, green, and blue LED. As a result, LEDs are being widely employed as a light source for a backlight of the LCD panel (or the like) in recent years.

Thus, in a backlight of an LCD employing LEDs, a current supplied to an LED is varied corresponding to brightness information of an image to improve picture quality and reduce power consumption. Specifically, the current supplied to the LED is varied using a pulse width modulation (PWM) method and a pulse amplitude modulation (PAM) method.

However, in an LED driver circuit of the related art, even when a PWM signal is in a off state, a high current is maintained within the driver circuit so that conduction loss of the circuit is increased, thus causing excessive component heat. Further, in the LED driver circuit of the related art, when a gradation of an image is changed by a large amount, there is a case where a current supplied to the LED is overshot (i.e., exceeds a target value). As a result, flickering appears and a color gamut of the LED is not dynamically changed.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a light emitting diode (LED) driver circuit having a driving mode including a normal mode maintaining a brightness of an LED and a dimming mode changing the brightness of the LED, the LED driver circuit including: the LED; a power unit which provides a current to the LED through an inductor; a dimming switch which is connected to the LED and bypasses the current provided to the LED; an input unit which receives brightness information of the LED; a logic unit which calculates reference currents for each driving mode according to the received brightness information; a current control unit which controls the power unit to provide the current based on the driving mode and the calculated reference currents to the inductor; and a switch control unit which switches the dimming switch on if the driving mode of the LED driver circuit is switched to the dimming mode.

The logic unit may further calculate a reference current of the normal mode according to the received brightness information and calculates a reference current of a dimming mode less than the calculated reference current of the normal mode.

The switch control unit may switch the dimming switch on after a preset time if the driving mode of the LED driver circuit is switched to the dimming mode.

The preset time may be a time at which an intensity of an inductor current flowing through the inductor is equal to or less than the calculated reference current of the dimming mode.

If the driving mode of the LED driver circuit is switched to the dimming mode, the switch control unit may switch the dimming switch off for the preset time and may switch the dimming switch on after the preset time.

The switch control unit may switch the dimming switch on if the driving mode of the LED driver circuit is switched to the dimming mode and an intensity of the current flowing through the inductor may be equal to or less than the calculated reference current of the dimming mode.

The current control unit may control the power unit to provide the current to the inductor based on the calculated reference current of the normal mode if the driving mode is the normal mode, and may control the power unit to provide the constant current to the inductor based on the calculated reference current of the dimming mode if the driving mode is the dimming mode.

The power unit may include: a constant current generation unit which generates the current; the inductor, wherein a first terminal of the inductor may be connected to a first terminal of the constant current generation unit, and a second terminal may be commonly connected to a first terminal of the dimming switch and an anode of the LED; a resistor, wherein a first terminal of the resistor may be commonly connected to a second terminal of the dimming switch and a cathode of the LED; a first switch, wherein a first terminal of the first switch may be commonly connected to the first terminal of the constant current generation unit and the first terminal of the inductor, and wherein a second terminal of the first switch may be connected to the resistor; and a second switch, wherein a first terminal of the second switch may be connected to a second terminal of the constant current generation unit, and wherein a second terminal of the second switch terminal may be commonly connected to the second terminal of the first switch and the resistor.

The current control unit may switch the first switch on and may switch the second switch off if the driving mode of the LED driver circuit is switched to the dimming mode.

The current control unit may alternatively drive the first switch and the second switch.

According to an aspect of an exemplary embodiment, there is provided a method of driving an LED in an LED driver circuit having a driving mode including a normal mode maintaining a brightness of the LED and a dimming mode changing the brightness of the LED, the method including: receiving brightness information of the LED; calculating reference currents for each driving mode according to the received brightness information; providing a current to an inductor connected to the LED based on a current driving mode of the LED driver circuit and the calculated reference currents; and switching a dimming switch on, wherein the dimming switch is connected to the LED and bypasses the current provided to the LED if the driving mode of the LED driver circuit is switched to the dimming mode.

The calculating the reference currents may include calculating a reference current of the normal mode according to the received brightness information and calculating a reference current of the dimming mode less than the calculated reference current of the normal mode.

The switching the dimming switch on may include switching the dimming switch on after a preset time if the driving mode of the LED driver circuit is switched to the dimming mode.

The preset time may be a time at which an intensity of a current flowing through the inductor is equal to or less than the calculated reference current of the dimming mode.

The switching the dimming switch on may include switching the dimming switch on if the driving mode of the LED driver circuit is switched to the dimming mode and an intensity of a current flowing through the inductor is equal to or less than the calculated reference current of the dimming mode.

The providing the current may include providing a first constant current to the inductor, wherein the first constant current corresponds to the calculated reference current of the normal mode if the driving mode is the normal mode, and providing a second constant current to the inductor, wherein the second constant current corresponds to the calculated reference current of the dimming mode if the driving mode is the dimming mode.

The brightness information may include at least one of a luminance and a color temperature of the LED.

The dimming switch may be connected in parallel to the to the LED.

The inductor may be connected in series to the to the LED.

The input unit may receive the brightness information from an external source.

Additional aspects of the exemplary embodiments will be set forth in the detailed description hereinbelow.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
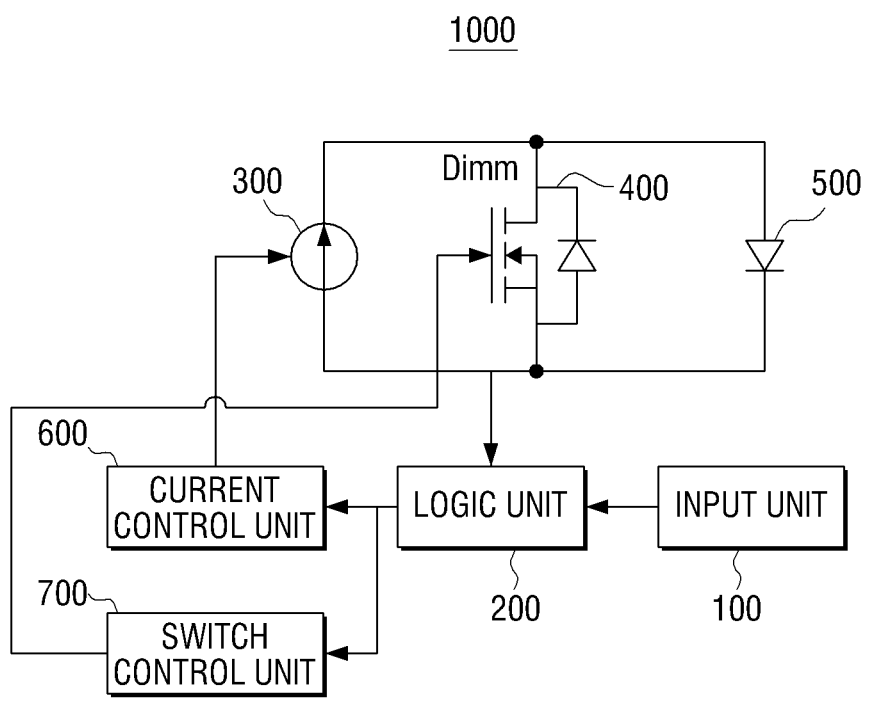
FIG. 1 is a view illustrating an LED driver circuit according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating an LED driver circuit according to an exemplary embodiment.

Referring to FIG. 1, the LED driver circuit 1000 according to the exemplary embodiment includes an input unit 100, a logic unit 200, a power unit 300, a dimming switch 400, an LED 500, a current control unit 600, and a switch control unit 700. The LED driver circuit 1000 has two driving modes. Specifically, the LED driver circuit 1000 has a normal mode maintaining brightness of the LED 500 and a dimming mode changing the brightness of the LED 500.

The input unit 100 receives brightness information of the LED 500. Here, the brightness information is information such as a luminance and a color temperature of the LED 500. Alternatively, the input unit 100 may receive a driving mode of the LED driver circuit 1000 from an external source. Although the exemplary embodiment has illustrated receiving the driving mode of the LED driver circuit 1000 from an external source, the LED driver circuit may be implemented to determine the driving mode according to the brightness information received through the input unit 100.

The logic unit 200 calculates reference currents for each driving mode different from each other according to the brightness information. Specifically, the logic unit 200 may calculate a value of reference current (iref1) of a normal mode according to the brightness information received through the input unit 100 and calculate a reference current iref2 of a dimming mode lower than the calculated reference current iref1 of the normal mode.

The power unit 300 provides a constant current to the LED 500 through an inductor thereof. Specific configuration and operation of the power unit 300 will be described with reference to FIG. 2 hereinbelow.

The dimming switch 400 of an exemplary embodiment is connected to the LED 500 in parallel, and bypasses a current provided to the LED 500 when turning on. Specifically, the dimming switch 400 is connected to each of the LED 500 and the power unit 300 in parallel. The dimming switch 400 may provide a constant current of the power unit 300 to the LED 500 when turning off and bypass the constant current of the power unit 300 when turning on.

The LED 500 emits light. Specifically, the LED 500 emits light having brightness corresponding to a current supplied through the power unit 300. Although an exemplary embodiment has illustrated that only one LED is disposed in the LED driver circuit 1000, the LED driver circuit 1000 may be implemented using an LED array in which a plurality of LED are connected in series. Alternatively, an LED array in which a plurality of LED are connected in parallel may be used in the LED circuit driver.

The current control unit 600 controls the power unit 300 to provide a constant current corresponding to the calculated reference current to the inductor. Specifically, according to the reference currents for each driving mode calculated through the logic unit 200, the current control unit 600 may control the power unit 300 to provide a constant current corresponding to the calculated value of reference current of the normal mode to the inductor of the power unit 300 when a current driving mode of the LED driver circuit 1000 is the normal mode and control the power unit 300 to provide a constant current corresponding to the calculated value of reference current of the dimming mode to the inductor of the power unit 300 when the current driving mode of the LED driver circuit 1000 is the dimming mode.

The switch control unit 700 controls the dimming switch 400. Specifically, the switch control unit 700 may turn on the dimming switch 400 after a preset time when the driving mode of the LED driver circuit 1000 is switched to the dimming mode. Here, the preset time is a time until an intensity of a current flowing in the inductor is equal to or lower than that of the calculated reference current of the dimming mode. Therefore, the switch control unit 700 may understand the preset time using the reference currents for each driving mode calculated using a look-up table which stores a preset time corresponding to the reference current of the normal mode and a preset time corresponding to the reference current of the dimming mode. The switch control unit 700 may turn on the dimming switch 400 when the driving mode of the LED driving circuit 1000 is switched to the dimming mode and the understood preset time has elapsed. Although the exemplary embodiment has illustrated only an example determining a time of turn-on of the dimming switch 400, the dimming switch control unit 700 may be implemented to measure a current flowing in the inductor and turn on the dimming switch 400 when an intensity of the measured current flowing in the inductor is equal to or lower than that of the calculated reference current of the dimming mode. As used herein, the terms "turn on" and "turn off," etc., refer to switching a circuit (e.g., a switching circuit) into an on or an off state, respectively.

As described above, the LED driver circuit 1000 according to the exemplary embodiment may constantly maintain the current of the inductor (a current lower than a current in a normal mode) even in the dimming mode to reduce component heat. Further, since the current of the inductor is constantly maintained, a fast current rise time may be ensured when switched to the normal mode to prevent gray scale distortion.

Figure 2:
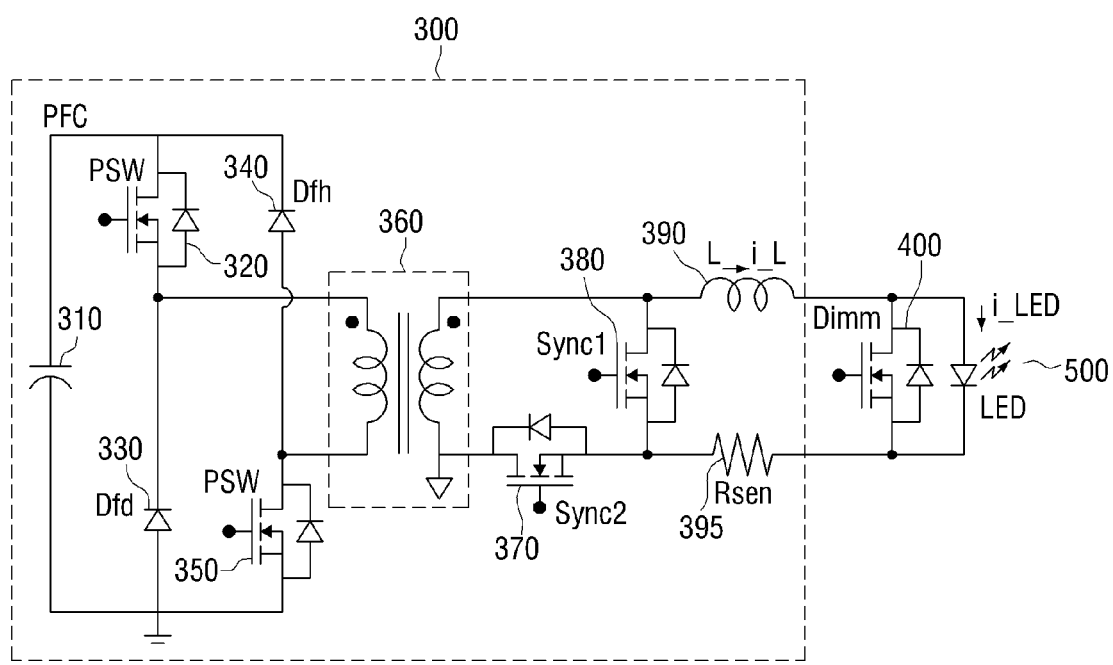
FIG. 2 is a circuit diagram illustrating an LED driver circuit according to an exemplary embodiment.

FIG. 2 is a circuit diagram of an LED driver circuit according to an exemplary embodiment.

Referring to FIG. 2, the LED driver circuit 1000 according to the exemplary embodiment includes a power unit 300, a dimming switch 400, and an LED 500. Although configurations of the input unit 100, the logic unit 200, the current control unit 600, and the switch control unit 700 of FIG. 1 have not been illustrated in FIG. 2, the configurations of the input unit 100, the logic unit 200, the current control unit 600, and the switch control unit 700 of FIG. 1 may be included in the LED driver circuit 1000 of FIG. 2.

The power unit 300 includes a constant current generation unit 310 to 360 which generates a constant current, an inductor 390, a resistor 395, a first switch 380, and a second switch 370.

The constant current generation unit 310 to 360 generates the constant current. Specifically, the constant current generation unit 310 to 360 may include a power source 310, a third switch 320, a first diode 330, a second diode 340, a fourth switch 350, and a transformer 360. As shown in FIG. 2, the constant current generation unit 310 to 360 is a constant current circuit generally used in an LED driver circuit and thus, its detailed description will be omitted.

The inductor 390 transfers the constant current generated in the constant current generation unit 310 to 360 to the LED 500. Specifically, one terminal of the inductor 390 is connected to a node in which the transformer 360 and the first switch 380 are commonly connected and the other terminal of the inductor 390 is connected to a node in which the anode of the LED 500 and the dimming switch 400 are commonly connected.

One terminal of the resistor 395 is connected to a node in which the first switch 380 and the second switch 370 are commonly connected and the other terminal of the resistor 395 is a node in which a cathode of the LED 500 and the dimming switch 400 are commonly connected.

One terminal of the first switch 380 is connected to a node in which the transformer 360 and the inductor 390 are commonly connected, and the other terminal of the first switch 380 is connected to a node in which the resistor 395 and the second switch 370 are commonly connected.

One terminal of the second switch 370 is connected to the transformer 360 and the other terminal of the second switch 370 is connected to a node in which the first switch 380 and the resistor 395 are commonly connected.

The dimming switch 400 bypasses a current provided to the LED 500. Specifically, one terminal of the dimming switch 400 is connected to a node in which the inductor and the anode of the LED 500 are commonly connected and the other terminal of the dimming switch 400 is connected to a node in which the cathode of the LED 500 and the resistor 395 are commonly connected.

The anode of the LED 500 is connected to a node in which the inductor 390 and the dimming switch 400 are commonly connected, and the cathode of the LED 500 is connected to a node in which the dimming switch 400 and the resistor 395 are commonly connected.

Figure 3:
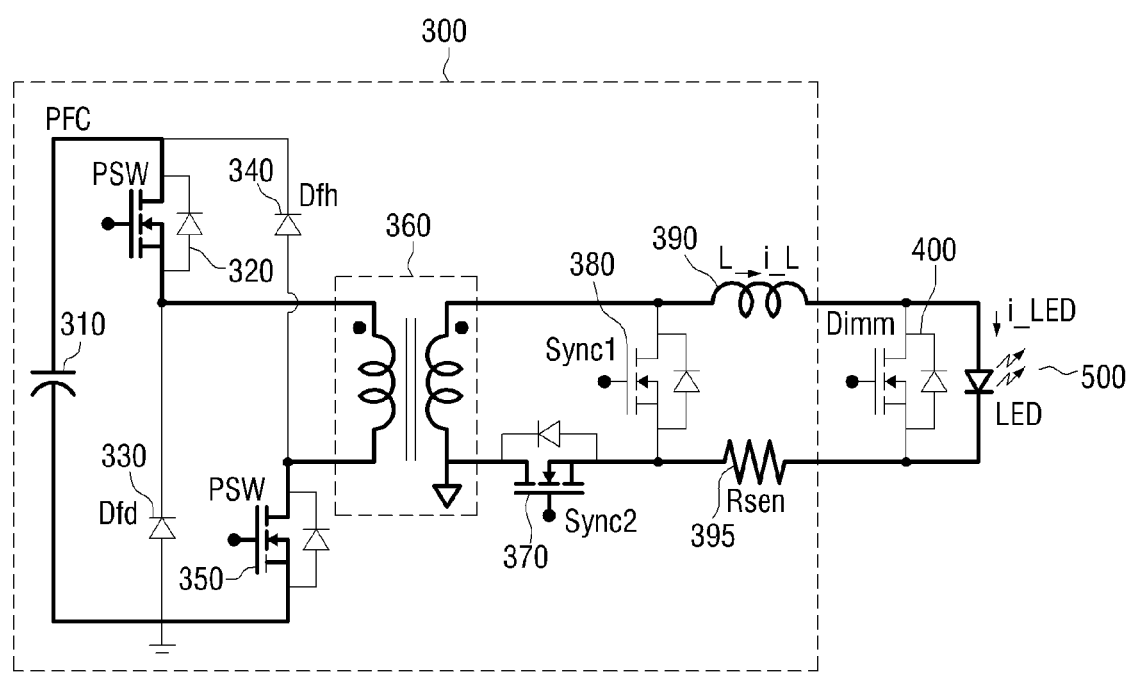
FIGS. 3 and 4 are circuit diagrams illustrating an operation of the LED driver circuit in a normal mode according to an exemplary embodiment.
Figure 4:
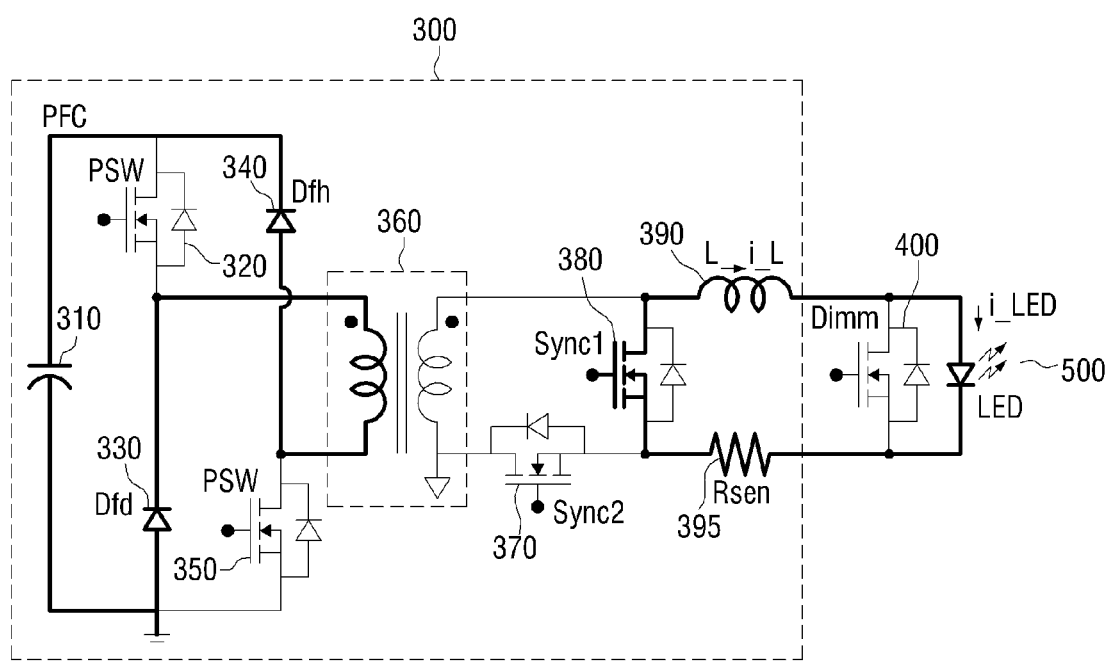
Figure 5:
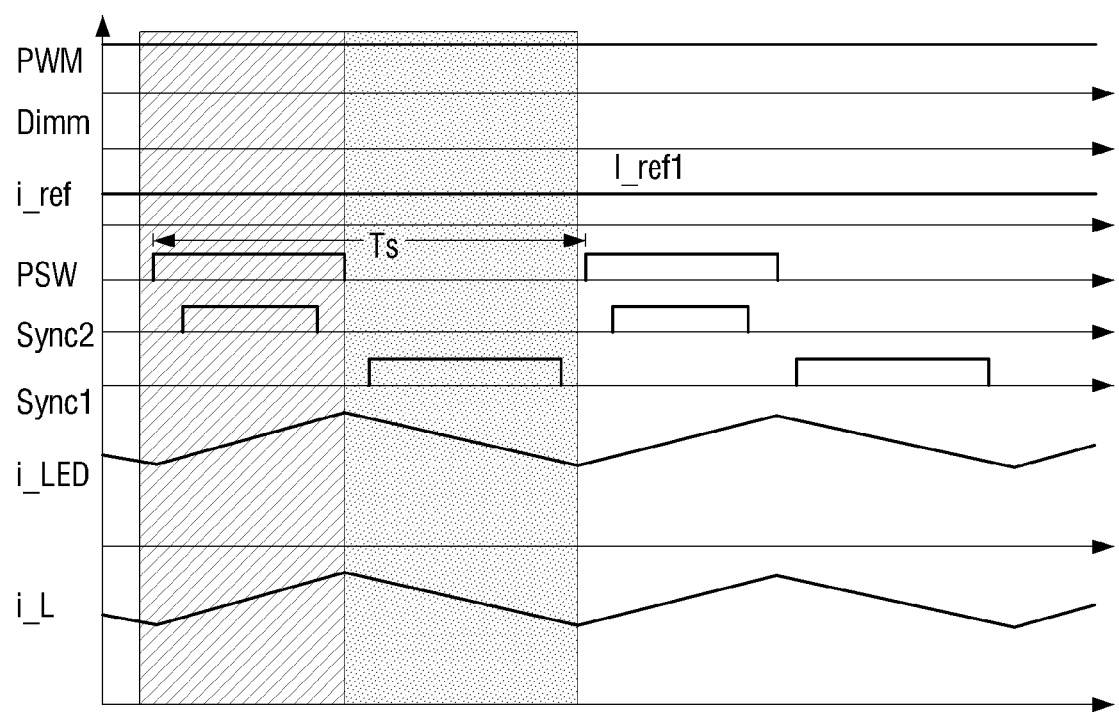
FIG. 5 is a waveform diagram illustrating an operation of an LED driver circuit in a normal mode according to an exemplary embodiment.

Hereinafter, an operation in a case where the LED driver circuit 1000 is in the normal mode will be described with reference to FIGS. 3 to 5.

First, the current control unit 600 controls the first switch 380, the second switch 370, the third switch 320, and the fourth switch 350 to generate a constant current corresponding to the reference current of the normal mode calculated in the logic unit 200.

Specifically, the current control unit 600 may turn off the first switch 380 and turn on the second switch 370, the third switch 320, and the fourth switch 350. Thereby, the LED driver circuit 1000 has a current path as shown in FIG. 3. Specifically, a primary side power of the transformer 360 is transferred to the secondary side thereof and the secondary side power of the transformer 360 is transferred to the LED 500 through the inductor 390. Thereby, as shown in FIG. 5, a current i_L flowing in the inductor 390 may be increased.

Hereafter, the current control unit 600 may turn on the first switch 380 and turn off the second switch 370, the third switch 320, and the fourth switch 350. Thereby, the LED driver circuit 1000 has a current path as shown in FIG. 4. Specifically, a current i_L stored in the inductor 390 is transferred to the LED 500. Thereby, as shown in FIG. 5, the current i_L flowing in the inductor may be reduced.

Hereinafter, an operation of the case where the LED driver circuit 1000 is in the dimming mode will be described with reference to FIGS. 6 to 9.

First, the current control unit 600 controls the first to fourth switches 380, 370, 320, and 350 to generate a constant current corresponding to the reference current of the dimming mode calculated in the logic unit 200.

Figure 6:
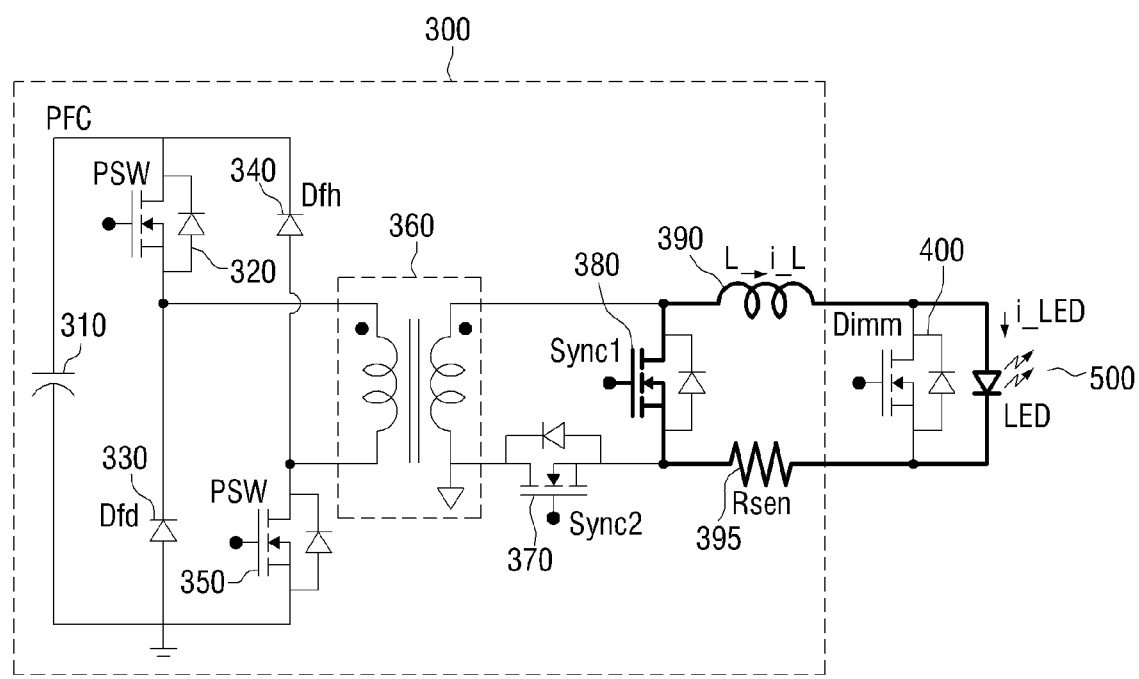
FIGS. 6 and 7 are circuit diagrams illustrating an operation of an LED driver circuit in a dimming mode according to an exemplary embodiment.
Figure 8:
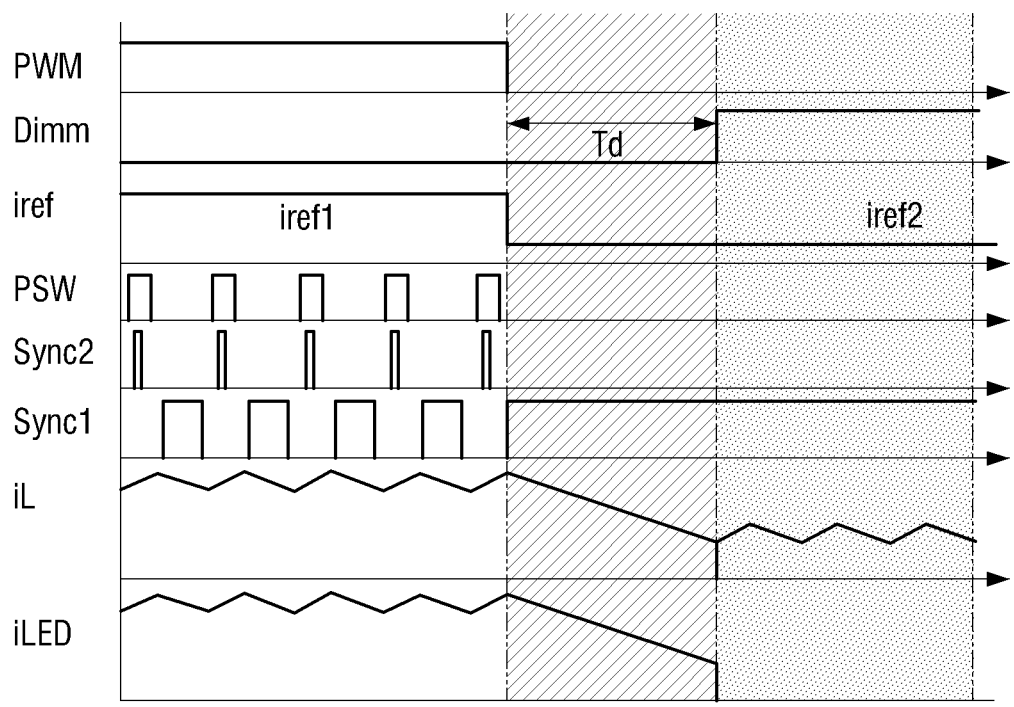
FIGS. 8 and 9 are waveform diagrams illustrating an operation of an LED driver circuit in a dimming mode according to an exemplary embodiment.

Specifically, the driving mode of the LED driver circuit 1000 is switched to the dimming mode, the current control unit 600 turns on the first switch 380 and turns off the second to fourth switches 370, 320, and 350 to reduce currents of the inductor 390 and the LED 500 (that is, since the reference current of the dimming mode is lower than the reference current of the normal mode). Therefore, the LED driver circuit 1000 has a current path as shown in FIG. 6. Specifically, a current stored in the inductor 390 is transferred to the LED 500. Thereby, as shown in FIG. 8, a current i_L flowing in the inductor 390 is reduced.

Figure 7:
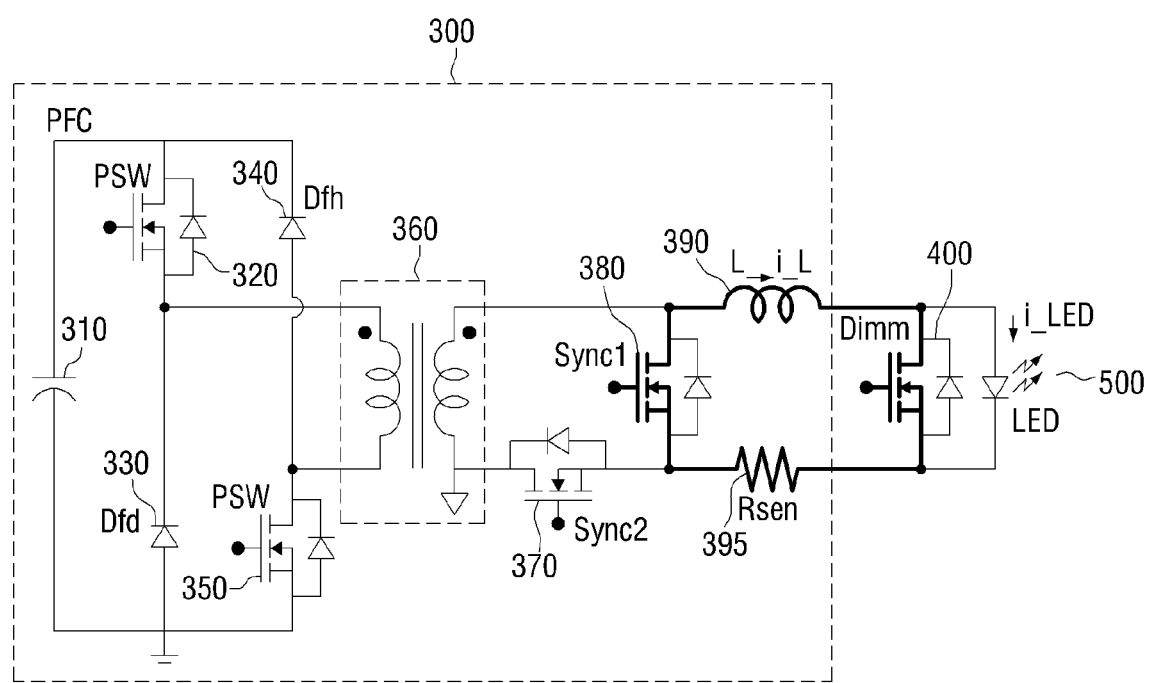

Hereafter, when the current i_L flowing in the inductor 390 is equal to or lower than the calculated reference current of the dimming mode, the switch control unit 700 turns on the dimming switch 400. Thereby, the LED driver circuit 1000 has a current path as shown in FIG. 7. Thereby, as shown in FIG. 8, the current provided to the LED 500 is blocked. As the first switch 380 and the second switch 370 alternatively operate, a constant current corresponding to the calculated reference current is provided to the inductor 390.

The current i_L flowing in the inductor 390 is equal to or lower than the calculated value of reference current of the dimming mode, the current control unit 600 turns off the first switch 380, and turns on the second to fourth switches 370, 320, and 350. Therefore, as shown in FIG. 8, a constant current corresponding to the reference current of the dimming mode calculated in the logic unit 200 flows in the inductor 390.

Figure 9:
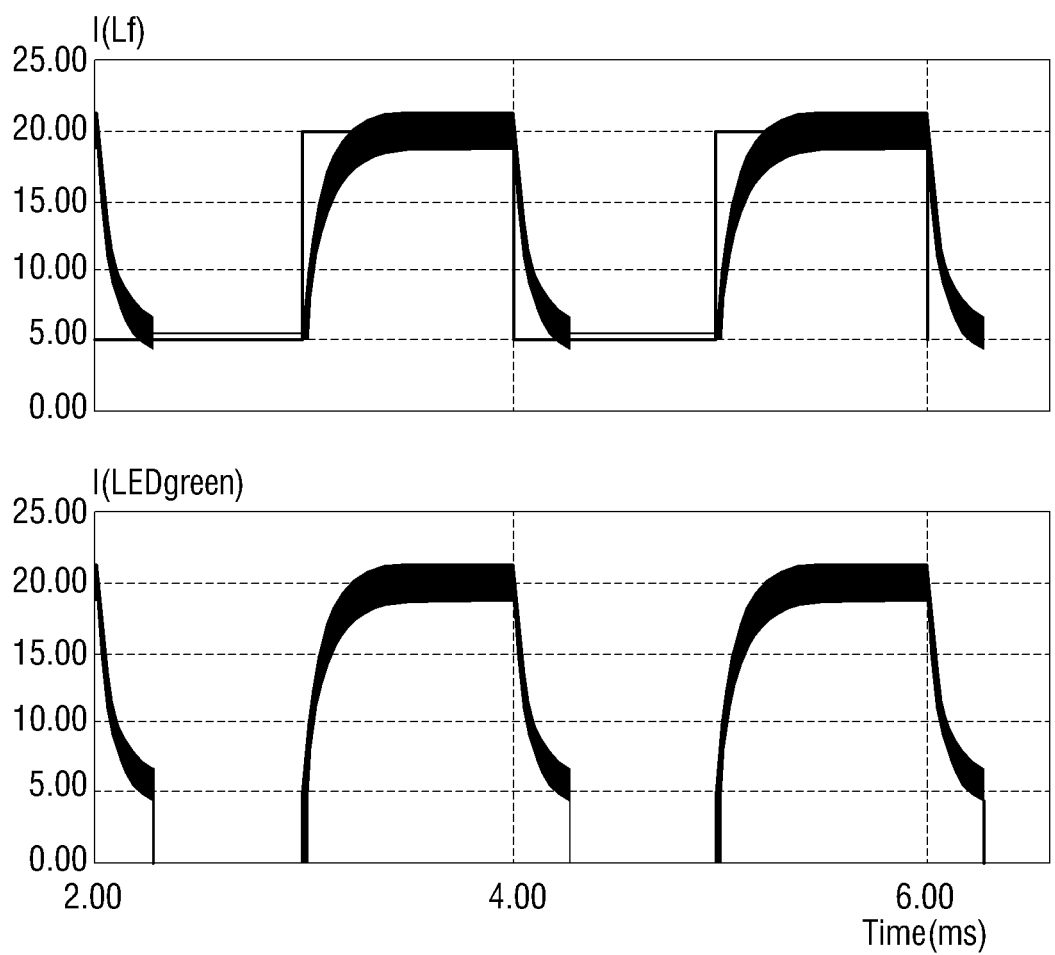

FIG. 9 is a current waveform diagram of the inductor and the LED in the dimming mode of the LED driver circuit according to an exemplary embodiment.

Referring to FIG. 9, it is seen that when the driving mode of the LED driver circuit is switched to the dimming mode, the current provided to the LED 500 is blocked after a preset time and a constant current corresponding to the reference current of the dimming mode flows in the inductor 390 even after the preset time.

Figure 10:
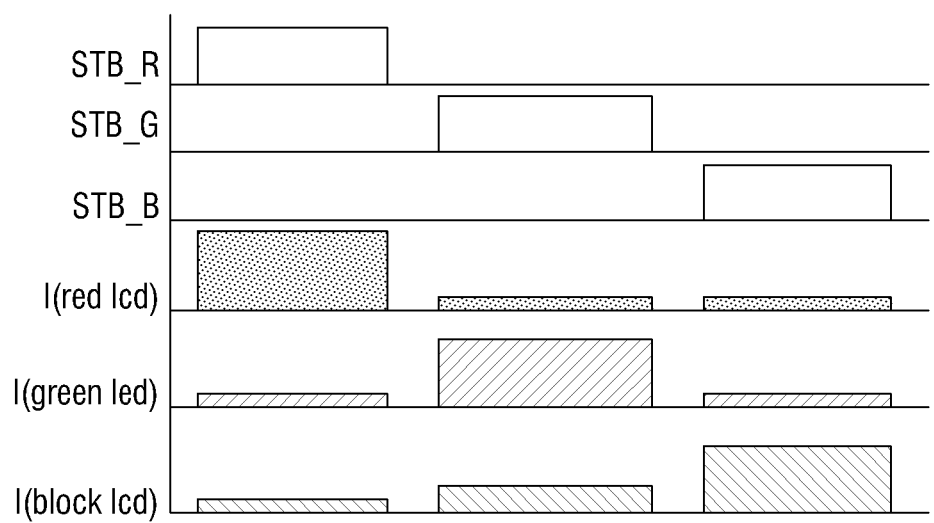
FIG. 10 is a waveform illustrating an operation of varying a color gamut.
Figure 11:
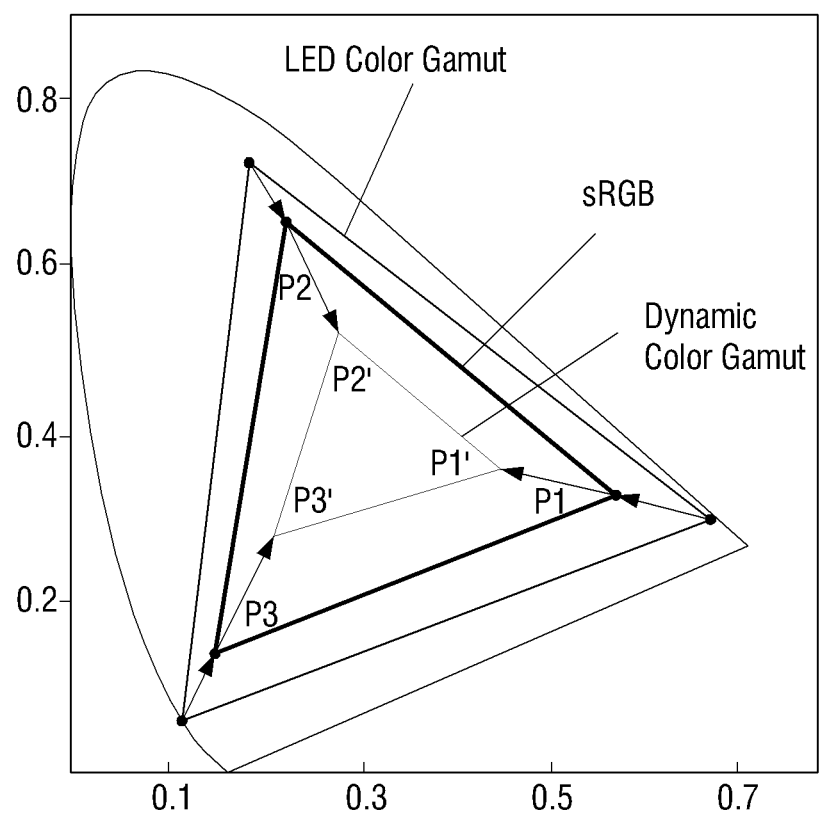
FIG. 11 is a view illustrating conversion of a dynamic color gamut.

As described above, even in the dimming mode, the constant current is maintained in the inductor 390 (i.e., a current lower than a current flowing in the normal mode) so that component heat may be reduced. Further, a fast current rise time may be ensured even when switched to the normal mode to prevent gray scale distortion. Specifically, as shown in FIGS. 10 and 11, it is seen that even when a gray scale of an image is largely changed, a color gamut is dynamically changed without an overshoot of driving current in the LED driver circuit 1000 according to the exemplary embodiment.

Figure 12:
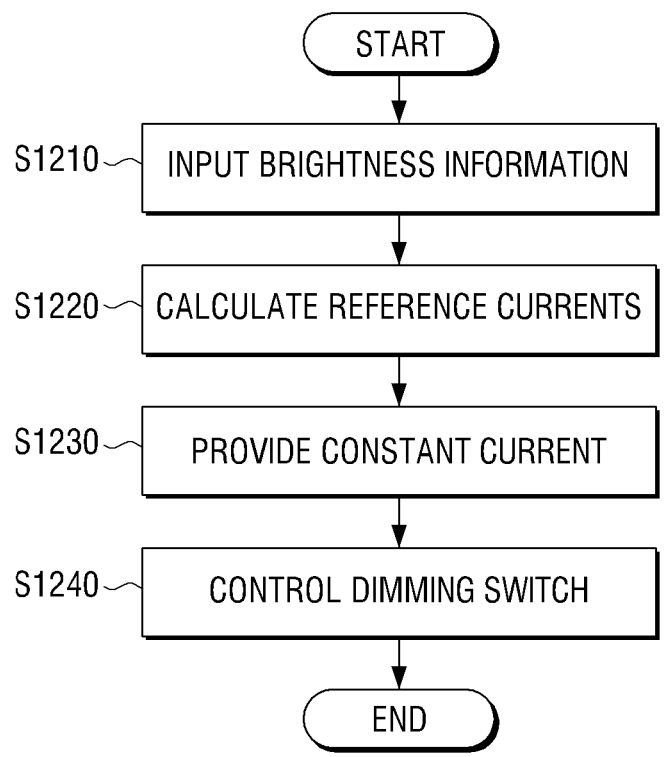
FIG. 12 is a flowchart illustrating a method of driving an LED according to an exemplary embodiment.

FIG. 12 is a flowchart illustrating a method of driving an LED according to an exemplary embodiment.

Referring to FIG. 12, first, brightness information of the LED 500 is received (S1210). Here, the brightness information is information such as luminance and/or color temperature of the LED 500.

Reference currents for each driving mode different from each other are calculated according to the received brightness information (S1220). Specifically, a reference current iref1 of the normal mode reference is calculated according to the received brightness information and a reference current iref2 of the dimming mode lower than the calculated reference current iref1 of the normal mode may be calculated.

According to an exemplary embodiment, a constant current, which corresponds to a current driving mode of the LED driver circuit 1000 and the calculated reference current, is provided to the inductor 390 connected to the LED 500 in series (S1230). Specifically, when the driving mode of the LED driver circuit 1000 is the normal mode, a constant current corresponding to the calculated reference current of the normal mode is provided to the inductor 390 and when the driving mode of the LED driver circuit 1000 is the dimming mode, a constant current corresponding to the calculated reference current of the dimming mode is provided to inductor 390.

The driving mode of the LED driver circuit 1000 is switched to the dimming mode, the dimming switch 400 is control to bypass a current provided to the LED after the preset time (S1240). Specifically, when the driving mode of the LED driver circuit 1000 is switched to the dimming mode, the dimming switch 400 may turned on after the preset time. Alternatively, a current flowing in the inductor 390 is measured and when an intensity of the measured current flowing in the inductor 390 is equal to or lower than that of the calculated reference current of the dimming mode, the dimming switch 400 may be turned on.

As described above, the method of driving the LED according to an exemplary embodiment constantly maintains a current (a current lower than a current flowing in a normal mode) flowing in the inductor even in a dimming mode to reduce component heat. Further, since the current flowing in the inductor is constantly maintained even in the dimming mode, a fast current rise time may be ensured when switched to a next normal mode to prevent gray scale distortion. The method of driving the LED as shown in FIG. 12 may be implemented on the LED driver circuit having the configuration of FIG. 1 as well as on LED driver circuits having the other configurations.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims. Many alternatives, modifications, and variations will be apparent to those skilled in the art.

What is claimed is:

1. A light emitting diode (LED) driver circuit having a driving mode including a normal mode maintaining a brightness of an LED and a dimming mode changing the brightness of the LED, the LED driver circuit comprising:
   the LED;
   a power unit which provides a current to the LED through an inductor;
   a dimming switch which is connected to the LED and bypasses the current provided to the LED;
   an input unit which receives brightness information of the LED;
   a logic unit which calculates reference currents for each driving mode according to the received brightness information;

a current control unit which controls the power unit to provide the current based on the driving mode and the calculated reference currents to the inductor; and a switch control unit which switches the dimming switch on if the driving mode of the LED driver circuit is switched to the dimming mode, wherein the logic unit further calculates a reference current of the normal mode according to the received brightness information and calculates a reference current of the dimming mode less than the calculated reference current of the normal mode.

2. The LED driver circuit as claimed in claim 1, wherein the switch control unit switches the dimming switch on after a preset time if the driving mode of the LED driver circuit is switched to the dimming mode.

3. The LED driver circuit as claimed in claim 2, wherein the preset time is a time at which an intensity of an inductor current flowing through the inductor is equal to or less than the calculated reference current of the dimming mode.

4. The LED circuit driver as claimed in claim 2, wherein, if the driving mode of the LED driver circuit is switched to the dimming mode, the switch control unit switches the dimming switch off for the preset time and switches the dimming switch on after the preset time.

5. The LED driver circuit as claimed in claim 1, wherein the switch control unit switches the dimming switch on if the driving mode of the LED driver circuit is switched to the dimming mode and an intensity of the current flowing through the inductor is equal to or less than the calculated reference current of the dimming mode.

6. The LED driver circuit as claimed in claim 1, wherein the current control unit controls the power unit to provide the current to the inductor based on the calculated reference current of the normal mode if the driving mode is the normal mode, and controls the power unit to provide the constant current to the inductor based on the calculated reference current of the dimming mode if the driving mode is the dimming mode.

7. The LED driver circuit as claimed in claim 1, wherein the power unit includes:
a constant current generation unit which generates the current;
the inductor, wherein a first terminal of the inductor is connected to a first terminal of the constant current generation unit, and a second terminal is commonly connected to a first terminal of the dimming switch and an anode of the LED;
a resistor, wherein a first terminal of the resistor is commonly connected to a second terminal of the dimming switch and a cathode of the LED;
a first switch, wherein a first terminal of the first switch is commonly connected to the first terminal of the constant current generation unit and the first terminal of the inductor, and wherein a second terminal of the first switch is connected to the resistor; and
a second switch, wherein a first terminal of the second switch is connected to a second terminal of the constant current generation unit, and wherein a second terminal of the second switch terminal is commonly connected to the second terminal of the first switch and the resistor.

8. The LED circuit driver as claimed in claim 7, wherein the current control unit switches the first switch on and switches the second switch off if the driving mode of the LED driver circuit is switched to the dimming mode.

9. The LED driver circuit as claimed in claim 7, wherein the current control unit alternatively drives the first switch and the second switch.

10. The LED driver circuit as claimed in claim 1, wherein the brightness information comprises at least one of a luminance and a color temperature of the LED.

11. The LED driver circuit as claimed in claim 1, wherein the dimming switch is connected in parallel to the to the LED.

12. The LED driver circuit as claimed in claim 1, wherein the inductor is connected in series to the to the LED.

13. The LED driver circuit as claimed in claim 1, wherein the input unit receives the brightness information from an external source.

14. A method of driving a light emitting diode (LED) in an LED driver circuit having a driving mode including a normal mode maintaining a brightness of the LED and a dimming mode changing the brightness of the LED, the method comprising:
receiving brightness information of the LED;
calculating reference currents for each driving mode according to the received brightness information;
providing a current to an inductor connected to the LED based on a current driving mode of the LED driver circuit and the calculated reference currents; and
switching a dimming switch on, wherein the dimming switch is connected to the LED and bypasses the current provided to the LED if the driving mode of the LED driver circuit is switched to the dimming mode,
wherein the calculating the reference currents includes calculating a reference current of the normal mode according to the received brightness information and calculating a reference current of the dimming mode less than the calculated reference current of the normal mode.

15. The method as claimed in claim 14, wherein the switching the dimming switch on includes switching the dimming switch on after a preset time if the driving mode of the LED driver circuit is switched to the dimming mode.

16. The method as claimed in claim 15, wherein the preset time is a time at which an intensity of a current flowing through the inductor is equal to or less than the calculated reference current of the dimming mode.

17. The method as claimed in claim 14, wherein the switching the dimming switch on includes switching the dimming switch on if the driving mode of the LED driver circuit is switched to the dimming mode and an intensity of a current flowing through the inductor is equal to or less than the calculated reference current of the dimming mode.

18. The method as claimed in claim 14, wherein the providing the current includes providing a first constant current to the inductor, wherein the first constant current corresponds to the calculated reference current of the normal mode if the driving mode is the normal mode, and providing a second constant current to the inductor, wherein the second constant current corresponds to the calculated reference current of the dimming mode if the driving mode is the dimming mode.

* * * * *